(12) United States Patent
Taki et al.

(10) Patent No.: US 6,536,995 B2
(45) Date of Patent: Mar. 25, 2003

(54) METHOD OF HARDENING SOIL AND HARDENED SOIL

(75) Inventors: Yoshihiro Taki, Saitama-ken (JP); Kiyokazu Sasaki, Nara-ken (JP); Shuji Yukitani, Osaka (JP)

(73) Assignee: Taguchi Technical Laboratory Co., Ltd., Osaka (JP)

( * ) Notice: Subject to any disclaimer, the term of this patent is extended or adjusted under 35 U.S.C. 154(b) by 0 days.

(21) Appl. No.: 09/834,953

(22) Filed: Apr. 16, 2001

(65) Prior Publication Data

US 2001/0046419 A1 Nov. 29, 2001

(30) Foreign Application Priority Data

Apr. 21, 2000 (JP) ........................................ 2000-121414

(51) Int. Cl.[7] .............................. E02D 3/12; C09K 17/40
(52) U.S. Cl. ........................ 405/266; 405/264; 106/601
(58) Field of Search ................................. 405/263, 266, 405/264, 270, 128.1–128.15; 106/607, 608, 627, 629

(56) References Cited

U.S. PATENT DOCUMENTS 4,043,830 A * 8/1977 Suzuki ................... 106/287.17
5,700,107 A * 12/1997 Newton ....................... 106/705

FOREIGN PATENT DOCUMENTS

JP     58-15582 A   *   1/1983
JP     61-133141 A   *   5/1986

OTHER PUBLICATIONS

Derwent abstract for JP–60–229984–A.*

* cited by examiner

*Primary Examiner*—David Bagnell
*Assistant Examiner*—John Kreck
(74) *Attorney, Agent, or Firm*—Dennison, Schultz & Dougherty

(57) ABSTRACT

A method for hardening soil and soil hardened with the method. The soil is mixed with cement and with a soil hardening agent including at least eight of the cations $Ca^{++}$, $Na^-$, $Mg^{++}$, $K^+$, $NH_4^+$, $Ba^{++}$, $Fe^{3+}$, $Al^{3+}$, $Mn^{4+}$, $Co^{++}$ and $Ti^{4+}$, at least two of the anions $Cl^-$, $SO_4^{--}$ and $PO_4^{3-}$ and at least one organic acid.

9 Claims, No Drawings

METHOD OF HARDENING SOIL AND HARDENED SOIL

BACKGROUND OF THE INVENTION

The present invention relates to a method for hardening soil.

There is a well-known soil-cement method for stabilizing soil in soft ground, where the soil is mixed with cement and a proper quantity of water.

However, when the soil contains 2% or more of organic materials mostly comprising inhibiting organic acids from corroded organism such as humic acid which is insoluble organic acid, the organic materials, which exist on the surfaces of the particles of the soil, draw the water of hydronium ion ($H_3O^+$) so that the soil particles are surrounded by the water. The bonding and solidification of the cement and the particles of soil are accordingly inhibited by the surrounding water, thereby largely deteriorating the hardening of the soil.

SUMMARY OF THE INVENTION

An object of the present invention is to provide a method for hardening the soil, and soil improved therewith, wherein the inhibition of the bond between the cement and soil due to the inhibiting organic acids such as humic acid included in the soil is restrained, hence solving the above described problem.

The present invention provides a method for hardening soil comprising the steps of mixing cement with soil, and mixing a soil improving agent including eight or more cations selected from $Ca^{++}$, $Na^+$, $Mg^{++}$, $K^+$, $NH_4^+$, $Ba^{++}$, $Fe^{3+}$, $Al^{3+}$, $Mn^{4+}$, $Co^{++}$ and $Ti^{4+}$, two or more anions selected from $Cl^-$, $SO_4^{--}$ and $PO_4^{3-}$, and organic acid with the soil mixed with cement.

Upon mixing of the cement with the soil, if the soil does not contain sufficient moisture necessary for solidification of the cement, an appropriate quantity of water is added. If the soil contains enough moisture, it is not necessary to use additional water. When the cement mixed with the mixing agent is injected in the earth or added to sludge in marshes, for example, an appropriate quantity of water is added thereto.

The organic acid consists one or more of citric acid, tartaric acid and maleic acid.

In the method, it is preferable to mix 0.32 to 2 kg in solid basis of mixing agent with a soil mixture including 20 to 600 kg of cement per 1 $m^3$ of soil.

Another method of the present invention is suitable for the soil including a large amount of inhibiting organic acids which is difficult to be hardened by the soil improving agent.

The method comprises mixing at least $Ca^{++}$ of bivalent or more cations and an organic acid having a chelate effect with a soil so as to neutralize inhibiting organic acids included in the soil, mixing cement with the mixture of $Ca^{++}$ and the organic acid and the soil, and mixing a soil improving agent including eight or more cations selected from $Ca^{++}$, $Na^+$, $Mg^{++}$, $K^+$, $NH_4^+$, $Ba^{++}$, $Fe^{3+}$, $Al^{3+}$, $Mn^{4+}$, $Co^{++}$ and $Ti^{4+}$, anions selected from $Cl^-$, $SO_4^{--}$ and $PO_4^{3-}$, with the mixed soil.

The quantity of the cation of bivalent or more is determined to a value necessary for neutralizing the hydrogen ion ($H^+$) (cation exchange capacity (CEC) value) in the carboxyl group (—COOH).

The present invention further provides an improved soil wherein the soil is mixed with cement, and further mixed with a mixing agent for improving soil including eight or more cations selected from $Ca^{++}$, $Na^+$, $Mg^{++}$, $K^+$, $NH_4^+$, $Ba^{++}$, $Fe^{3+}$, $Al^{3+}$, $Mn^{4+}$, $Co^{++}$ and $Ti^{4+}$, two or more anions selected from $Cl^-$, $SO_4^{--}$ and $PO_4^{3-}$, and organic acid.

The organic acid comprises one or more of citric acid, tartaric acid and maleic acid.

In the improved soil, 0.32 to 2 kg in solid basis of mixing agent is mixed with a soil mixture including 20 to 600 kg of cement per 1 $m^3$ of soil.

These and other objects and features of the present invention will become more apparent from the following detailed description.

DETAILED DESCRIPTION OF THE PREFERRED EMBODIMENT

A mixing agent for hardening soil in accordance with the present invention comprises a pulverized solid mixing agent and a liquid mixing agent.

The solid mixing agent includes one or more of magnesium chloride ($MgCl_2$), potassium chloride (KCl), calcium chloride ($CaCl_2$), sodium chloride (NaCl), and ammonium chloride ($NH_4Cl$), each of 100 to 300 g, and 10 to 20 g of an agent consisting of cobaltous chloride ($CoCl_2$), barium oxide (BaO), calcium sulfate ($CaSO_4$), calcium phosphate ($CaHPO_4$), and manganese dioxide ($MnO_2$). The solid mixing agent further includes one or more of organic acids such as 10 to 30 g of citric acid ($C_6H_8O_7$).

Mineral components extracted from natural vermicurite with sulfuric acid are used as the liquid mixing agent. An example of the composite of the undiluted solution for the liquid mixing agent is set below. Each component of the liquid mixing agent exists in the form of ions or minerals, and the specific gravity thereof is between 1.1 and 1.2, and pH is between 0.3 and 1.0.

| | |
|---|---|
| Iron (Fe) | 22.7 g/l |
| Aluminum (Al) | 9.1 g/l |
| Magnesium (Mg) | 2.7 g/l |
| Potassium (K) | 1.5 g/l |
| Titanium (Ti) | 832 mg/l |
| Manganese (Mn) | 559 mg/l |
| Phosphor (P) | 216 mg/l |
| Calcium (Ca) | 129 mg/l |
| Sodium (Na) | 101 mg/l |
| Silicon (Si) | 55 mg/l |
| Zinc (Zn) | 42 mg/l |
| Selenium (Se) | 32 mg/l |
| Vanadium (V) | 19 mg/l |
| Copper (Cu) | 8.4 mg/l |
| Germanium (Ge) | 8.0 mg/l |
| Cobalt (Co) | 7.0 mg/l |
| Nickel (Ni) | 6.5 mg/l |
| Molybdenum (Mo) | 4.4 mg/l |
| Lithium (Li) | 4.0 mg/l |
| Free sulfuric acid ion ($SO_4^{2-}$) | 25 mg/l |

The above described liquid mixing agent is diluted 2000 times so that the sulfuric acid density becomes about 100 ppm so as to be used. The liquid mixing agent, which also serves as a diluent, is mixed with the solid mixing agent as desired in accordance with the purpose, thereby producing the soil improving mixing agent.

The above described mixing agent for hardening soil is added to 1 $m^3$ of soil, and mixed with 20 to 600 kg, more preferably with 50 to 300 kg, of cement to harden the soil. Upon mixing of the cement with the soil, if the soil does not contain sufficient moisture necessary for solidification of the cement, an appropriate quantity of water is added. If the soil contains enough moisture, it is not necessary to use additional water. When the cement mixed with the mixing agent is injected in the earth or added to sludge in marshes, for example, an appropriate quantity of water is added thereto.

When the cement is mixed with water, the elements in the cement such as CaO, $SiO_2$, $Al_2O_2$, $Fe_2O_3$, solidify due to various reactions thereof, while forming various inorganic salts, crystals of water-containing salt thereof, and solid solution. The bonding of the solidified cement elements and the grains of soil must be strengthened in order to increase the hardness of the foundation. Moreover, the hardened soil must have numerous fine pores so as to be used for permeable road and parking lot, for solidifying sludge and planting greenery thereon, and for treating the normal plane of a river bank for growing plants. In order to achieve these objectives in the conventional soil-cement method, it is essential that, of various inorganic salts, needle crystals mainly comprising chlorettringite, which is a water-containing salt including four components which are $CaO$—$SiO_2$—$Al_2O_3$—$Cl$ must be formed and stabilized.

The soil hardening mixing agent of the present invention is used for the purpose of forming numerous fine pores about the firm and stable crystal group. In the improved soil, there is provided solid solution where various inorganic salts other than the chlorettringite, and planar or needle crystals of the water-containing salt thereof are mingled together. The solid solution is intensely bonded with the grains of the soil, thereby increasing the hardness thereof. In addition, the mixing agent for improving soil is used during a sludge treatment to chemically decompose the sludge and to decrease the quantity of odorous substances and to absorb the substances within the fine gaps between the crystal groups. The soil improving mixing agent is a mixture of the above described solid mixing agent and the liquid mixing agent. The agent is mixed with a mixture of soil and cement in a small amount to achieve the effect. The effect is obtained by the synergic action of various components included in the solid and liquid mixing agents. The effect of each major component and the reason for determining the blending proportions thereof are described hereinafter.

When the cement is hardened or solidified, aluminates in the hardening cement (which is becoming hard) react with various sulfates to form compounds comprising mainly needle crystals having light specific gravity of 1.78 called ettringite ($3CaO.Al_2O_3.3CaSO_4.31 \sim 33H_2O$). When the needle crystals are generated in a large quantity, water permeability is increased. On the other hand, when the needle crystal grows and hence expands, the hardness is decreased. Thus, it is desired to adopt a means to maintain the permeability without decreasing the hardness.

Therefore, although needle crystals are left as a basic means, crystals of various shapes such as planar crystals are formed around the needle crystal to provide a hard mixture including innumerable fine pores. There are various components included in the mixing agent, which contribute for forming crystals of planar and other shapes. Namely, as the main solid needle crystal, in addition to the above described ettringite, the similar chlorettringite, where $SO_4^{2-}$ of the ettringite is substituted with $Cl^-$, is formed. At the same time, crystals of various other shapes are formed around the ettringite and chlorettringite. The crystals must be intricately intertwined so as to strengthen and stabilize the needle crystals, so that the function of each component and the mixing ratio thereof must be determined within a predetermined range in view of the above.

In accordance with the present invention, organic acids such as citric acid, tartaric acid, and maleic acid are added to the solid mixing agent.

The citric acid, which is one of the organic acids, acts as salts of alkali metal such as $Na^+$ and $K^+$, for example sodium citrate and potassium citrate, on a crystal growth surface of such components as gypsum in the hardening cement, thereby allowing the planar prism crystal to grow. Other organic acids such as tartaric acid and maleic acid work to the same effect. If the quantity of citric acid is less than 10 g, the contribution thereof to the crystal growth is small, and on the other hand, if the quantity is larger than 30 g, the hardness of the porous structure is reduced. Likewise, calcium chloride, sodium chloride, potassium chloride, magnesium chloride, and ammonium chloride serve to form planar crystals of various different substances such as gypsum. However, these chlorides are required in a larger addition amount than the citric acid. If the amount is less than 100 g, no effect for improving hardness is observed, and if the amount of each exceeds 300 g, the amount of the accompanying chloride ions is increased, thereby increasing the needle crystalline ettringite. As a result, the rate of the needle crystal to other crystal structures is reduced, thereby causing undesirable decrease of the hardness of the porous structure.

Although the addition quantities of cobaltous chloride, barium oxide, calcium sulfate, manganese dioxide, and calcium phosphate added are small compared to the above mentioned metal alkalides and earth metal alkalides, each serve to convert the salt derived from ettringite, such as gypsum or calcium hydroxide, and Tobermorite and monosulphate into planar or amorphous crystals. More particularly, when the various above described crystals are produced, disorderly ion substitutions of various metal ions take place, which causes gaps in lattices of the crystals to generate, thereby causing change in crystal structure. Therefore, various salts must be added, although slight in quantity.

For example, barium (Ba) contributes to enhance the formation of elliptic crystals, while manganese (Mn) contributes to enhance the growth of hexagonal crystals and cobalt (Co), the formation of crystals of other shapes, respectively. Although each mixing quantity is so small that it is difficult to distinguish the effects thereof, when the total amount exceeds 20 g, the effects reach the ceiling. Since most of these metal salts are expensive compared to other components, the preferred adding quantity is about 10 g in total. These traceable components may be obviated dependent on the desired value of hardness and pore rate, and on usage of the soil.

The combined use of the liquid mixing agent is advisable for reducing the putrefactive odor. More particularly, the solid mixing agent is dissolved in water at use to form a solution, the concentration of which is about 10%, and sprayed on the mixture of soil and cement. The liquid mixing agent is used as a diluent at that time. As described above, the liquid mixing agent comprises mineral components which are extracted with sulfuric acid from natural vermicurite. The liquid mixing agent is diluted 2000 times with water depending on the use thereof, so that, in most cases, the sulfuric acid concentration is 100 ppm. The solution is characterized in that it includes OH radicals as dissolved oxygen which is one form of active oxygen, and that it includes various metal ions and minerals. The OH radicals oxidize organic pollutant and decays included in sludge, or due to interaction with included minerals, change the molecular structure of soluble organic substances, thereby separating insoluble salts. Hence the pollutant is decreased and elution of the pollutant from solidified sludge and emission of odor are restrained. Moreover, the metal ions and minerals included in the liquid mixing agent cause the same effect as those in the solid mixing agent. A large number of diverse metal ions and sulfuric acid ions serve to change the crystal structure and the shape of various (complex) salts, thereby contributing towards forming a closely solidified soil. The dilution rate of the liquid mixing agent can be determined as desired depending on the degree of odor of the sludge which is to be treated.

By using such solid and liquid mixing agents, it is possible to solidify soil with more than 2% inhibiting organic acids. However, the soil may not solidify owing to the organic acid components contained therein although the organic acid content may be less than 2%. A search for the reason why the soil is difficult to solidify if inhibiting organic acid is included in large quantity revealed that the quantity of carboxyl group (—COOH) included in the structure of the organic acid was the main factor. The quantity can be represented by a cation exchange capacity (CEC), a correlation of which to organic matter (OM) value in the soil is also noted.

The carboxyl group has a characteristic of an extremely strong acid, and strongly attracts the above described hydronium-ionized moisture molecules about the surroundings thereof, which interferes with the hardening. The interference can be restrained when a terminal ion $H^+$ of the carboxyl group is neutralized by ion exchange with the metal cation such as $Ca^{++}$. In order that the further added metal ions such as $Ca^{++}$ effectively reach the carboxyl groups in the soil to neutralize them in accordance with the quantities of metal ion in the liquid mixing agent and carboxyl group in the soil, substances having chelate effect are further simultaneously added as a carrier for metal ions. Such substances are sodium of citric acid, tartaric acid, maleic acid, ethylenediaminetetraacetic acid (EDTA), sodium of nitrohumic acid, and ammonium salt. A water solution comprising substances having chelate effect such as $Ca^{++}$ and citric acid in quantities corresponding to the quantities of the carboxyl groups in the soil added to water, or a pulverized mixture thereof may be used instead of the liquid mixing agent. These chemicals are applied to and mixed with soil as a pretreatment so as to effectuate the neutralization. Thereafter, cement, a suitable quantity of water, and the soil improving mixing agent of the present invention are mixed together so as to realize the hardening of the soil including a large amount of rot which heretofore had been difficult to harden.

Various examples according to the present invention are described hereinafter.

EXAMPLE 1

The selected components for the solid mixing agent were as follows.

| | |
|---|---|
| Magnesium chloride ($MgCl_2$) | 175 g (20.0%) |
| Potassium chloride (KCl) | 250 g (28.4%) |
| Calcium chloride ($CaCl_2$) | 175 g (20.0%) |
| Sodium chloride (NaCl) | 125 g (14.2%) |
| Ammonium chloride ($NH_4Cl$) | 125 g (14.2%) |
| Cobaltous chloride ($CoCl_2$) | 1.5 g |
| Barium oxide (BaO) | 3.9 g |
| Calcium sulfate ($CaSO_4$) | 3.6 g |
| Calcium phosphate ($CaHPO_4$) | 3.5 g |
| Manganese dioxide ($MnO_2$) | 0.58 g |
| (Total of cobaltous chloride, barium oxide, calcium sulfate, calcium phosphate, and manganese dioxide) | 13.08 g (1.5%) |
| Citric acid ($C_6H_8O_7$) | 15 g (1.7%) |
| Total | 878.08 g (100.0%) |

A liquid mixing agent in the following blending proportions was used. One kg of the above described solid mixing agent was dissolved in the liquid mixing agent (in the example, liquid of radical water diluted 800 times) to provide a quantity of 10l. The components of the resultant soil hardening mixing agent were as follows. Weights of metals and others shown are values converted by gravitational conversion factors.

| | |
|---|---|
| Calcium (Ca) | 7,700 mg/l |
| Potassium (K) | 15,000 mg/l |
| Magnesium (Mg) | 2,700 mg/l |
| Sodium (Na) | 9,200 mg/l |
| Cobalt (Co) | 45 mg/l |
| Phosphor (P) | 4.0 mg/l |
| Silicon (Si) | 4.3 mg/l |
| Germanium (Ge) | <1 mg/l |
| Zinc (Zn) | 0.05 mg/l |
| Manganese (Mn) | 0.10 mg/l |
| Iron (Fe) | 1.3 mg/l |
| Copper (Cu) | 0.14 mg/l |
| Selenium (Se) | <0.01 mg/l |
| Nickel (Ni) | 0.05 mg/l |
| Molybdenum (Mo) | <0.1 mg/l |
| Lithium (Li) | 0.3 mg/l |
| Vanadium (V) | <0.1 mg/l |
| Tungsten (W) | <1 mg/l |
| Barium (Ba) | <1 mg/l |
| Titanium (Ti) | <1 mg/l |
| Rubidium (Pb) | <1 mg/l |
| Aluminum (Al) | 0.94 mg/l |
| Ammonium ($NH^{4+}$) | <1 mg/l |
| pH | 3.2 [−] |
| Chloride ion ($Cl^-$) | 4.5 wt % |
| Sulfate ion ($SO_4^{--}$) | <0.05 wt % |
| Phosphate ion ($Po_4^{3-}$) | <0.01 wt % |
| Citric acid | 0.25 wt % |

As a pretreatment for solidifying muck having a CEC value of 28.8 meq./100 g and OM value of 9%, which is difficult to solidify with cement, using the soil hardening mixing agent of the above described blending proportions, mixture of calcium chloride and citric acid added to water and liquid mixing agent (diluted 800 times) was mixed with fresh soil. Thereafter, a mixture of the solid soil hardening mixing agent, cement and an appropriate amount of water were further added, mixed, and the mixture solidified. Uniaxial compressive strengths detected after solidification are shown in Table 1.

TABLE 1

| SAMPLE No. | SOIL (g) FRESH SOIL | SOIL (g) MUCK | PRETREATMENT CHEMICAL (g) WATER OR LIQUID MIXING AGENT (RW) | PRETREATMENT CHEMICAL (g) $CaCl_2$ | PRETREATMENT CHEMICAL (g) CITRIC ACID | CEMENT SOLIDIFYING AGENT (g) CEMENT | CEMENT SOLIDIFYING AGENT (g) SOIL IMPROVING MIXING AGENT | UNIAXIAL COMPRESSIVE STRENGTH $Kgf/cm^2$ |
|---|---|---|---|---|---|---|---|---|
| 1 | 300 | 200 | WATER:30 | — | — | 24 | 4.8 | 2.04 |
| 2 | 300 | 200 | WATER:23 | 6 | 1 | 24 | 4.8 | 2.35 |
| 3 | 300 | 200 | RW:30 | — | — | 24 | 4.8 | 2.00 |
| 4 | 300 | 200 | RW:24 | 6 | — | 24 | 4.8 | 2.31 |
| 5 | 300 | 200 | RW:23 | 6 | 1 | 24 | 4.8 | 2.40 |
| 6 | 500 | — | — | — | — | 24 | 4.8 | 18.88 |

As can be seen from the test results, whereas the strength of the sample without the pretreatment chemical was less than 2.00 kgf/cm$^2$, the strength increased to 2.3 kgf/cm$^2$ when the calcium chloride was added, and with further addition of citric acid thereto, to 2.35 to 2.4 kgf/cm$^2$. The adding effect of the calcium chloride and enhancing effect of the citric acid were thus noted.

EXAMPLE 2

A test was conducted aiming to obtain design mix values for achieving a desired compressive strength of 17 kg/cm$^2$ for improving foundation stability of the normal plane of a collapsed road. The mixing agent having the same blending proportions as in the Example 1 was used. The quality of the soil subjected to the test was silt including conglomerates and having moisture content of 16.4%, wetting density of 1.893 g/cm$^3$, and drying density of 1.626 g/cm$^3$. Three types of cements, namely 80 kg/m$^3$, 100 kg/m$^3$, and 120 kg/m$^3$ were chosen and the quantity of the soil improving mixing agent of the present invention was 1 kg/m$^3$ in solid basis. The following shows the test results according to the blending proportions.

TABLE 2

| SAMPLE NO. | SOIL IMPROVING MIXING AGENT (kg/m$^3$) | CEMENT (kg/m$^3$) | QUANTITY OF ADDED WATER (l/m$^3$) | WETTING DENSITY (g/cm$^2$) | DRYING DENSITY (g/cm$^2$) | COMPRESSIVE STRENGTH (g/cm$^2$) | COEFFICIENT OF DEFORMATION (g/cm$^2$) |
|---|---|---|---|---|---|---|---|
| 1 | 1 | 80 | 80 | 2.03 | 1.69 | 19.9 | 1250 |
| 2 | 1 | 80 | 80 | 1.99 | 1.66 | 22.0 | 1280 |
| 3 | 1 | 100 | 90 | 1.99 | 1.67 | 27.5 | 1368 |
| 4 | 1 | 100 | 90 | 2.02 | 1.70 | 28.3 | 1410 |
| 5 | 1 | 120 | 100 | 2.04 | 1.73 | 35.5 | 1420 |
| 6 | 1 | 120 | 100 | 2.06 | 1.75 | 34.9 | 1460 |

It was found from the above test results that in order to achieve the desired compressive strength of 17 kf/cm$^2$, the required basic blend was 80 kg of cement, 1 kg of soil hardening mixing agent of the present invention, and 80 l of water per 1 m$^3$ of the field soil. The blend is for achieving the strength after 7 days and the extra strength achieved with the lapse of time can be considered as a safety margin.

EXAMPLE 3

A test was carried out using the soil hardening mixing agent having the same blending proportions as in the Example 1 to improve a roadbed of a road constructed based on a city plan so as to improve the CBR value. The width of the road subjected to the test was 18 m and the improving depth was 0.4 in. For each 1 m$^3$ of field soil, 60 kg of cement and 0.7 kg (solid basis) of the soil hardening mixing agent of the present invention were used.

First of all, the roadbed was arranged and a CBR test of the field soil was performed. The cement was next dispersed on the roadbed, and stirred and mixed with a backhoe. Thereafter, 0.7 kg (solid basis) of the soil improving mixing agent, which amounts to diluting the agent 10 times with the liquid mixing agent, was dispersed. A tire roller was rolled over the field soil to compress the soil. The CBR test was carried out after curing for 7 days.

As a comparative example, an improvement of field soil was carried out employing the same method as above except for the soil hardening mixing agent, that is, using cement, rolled and compressed with tire roller. The CBR test was carried out after curing for 7 days.

In accordance with the test, in the case of just the field soil, the CBR value was 2.9%, and when only cement was mixed with the field soil, the CBR value was 15.3%. Whereas when the cement and the soil hardening mixing agent were mixed with the field soil, the CBR value increased to 25.5%, thus achieving an extremely satisfactory result. As clear from the results, the inhibition of bond between cement and soil caused by an inhibiting organic substance such as humic acid is restrained, thereby increasing the hardness of the soil.

EXAMPLE 4

A solidification treatment test of reclaimed ground was carried out using the soil hardening mixing agent having the same blending proportions as in the Example 1. In the course of the solidification treatment test, of an upper 0.75 m portion of the actual foundation, the lower 0.4 in portion was subjected to a primary paving, and the upper 0.35 m portion was subjected to a secondary paving. The solidification area was 200 m², volume 150 m³, and the gradient 3%. Prior to the test, laboratory tests with regard to the uniaxial compressive strength and permeability were performed to determine the characteristic of the field foundation. The results of the laboratory tests are shown in the Table 3. The blending proportions are represented by the blending quantity per 1 m³ of soil hardening mixing agent.

TABLE 3

| BLENDING PROPORTION | UNIAXIAL COMPRESSIVE STRENGTH (kg/cm²) | | PERMEABILITY COEFFICIENT (cm/sec) | |
|---|---|---|---|---|
| | 7-DAY CURE | 28-DAY CURE | PRIMARY PAVING | SECONDARY PAVING |
| 80 kg/m³ | 7.37 | 11.58 | $3.02 \times 10^{-6}$ | $5.42 \times 10^{-7}$ |
| 100 kg/m³ | 10.3 | 18.11 | CURE:16 DAYS | CURE:16 DAYS |
| 120 kg/m³ | 12.9 | 22.59 | | |
| 140 kg/m³ | 14.0 | 28.28 | | |

REMARKS: The blending proportion in permeability coefficient test was 90 kg/m³.

The laboratory tests showed sufficient strength and permeability of the field foundation so that the solidification test was carried out as described above. The results are shown in Table 4.

TABLE 4

| BLENDING PROPORTION | UNIAXIAL COMPRESSIVE STRENGTH (kg/cm²) | | | PERMEABILITY COEFFICIENT (cm/sec) | |
|---|---|---|---|---|---|
| | 7-DAY CURE | 28-DAY CURE | FIELD CURE | PRIMARY PAVING | SECONDARY PAVING |
| 90 kg/m³ | 4.72 | 7.76 | — | $1.89 \times 10^{-6}$ | $1.64 \times 10^{-6}$ |
| | 6.07 | 13.41 | | $5.22 \times 10^{-7}$ | $3.86 \times 10^{-7}$ |
| | 3.82 | 8.99 | | | |
| | 4.27 | 4.50 | | | |
| | 4.83 | 13.53 | | | |
| | 6.75 | 13.53 | | | |

REMARKS: Average uniaxial compressive strength: 7-day cure: 5.08  29-day cure: 10.28

As can be understood from the above test results, satisfactory values for both the uniaxial compressive strength and permeability were obtained. Therefore, a local subsidence such as cave-in of the foundation due to the load applied through landfill with waste was prevented. In addition, leachate collection and drainage conduits and drain layers were able to function since the soil is prevented from entering therein and causing a counter gradient. As a result, operability and drivabilty of machinery during a construction of foundation facilities were maintained. Moreover, by employing the soil improving mixing agent of the present invention, the inhibition of bond between cement and soil caused by an organic substance such as humic acid was restrained, thereby increasing the hardness of the soil. Furthermore, in addition to enabling to improve the permeability as a result of hydration, by forming the porous ettringite crystals as described above, harmful heavy metals melted in the soil were adsorped and fixed, so that the elution quantity thereof and hence odor were reduced.

EXAMPLE 5

The soil improving mixing agent having the same blending proportions as in the Example 1 was used to solidify a dehydrated cake of sewage slime generated at a clarification plant so as to have the uniaxial compressive strength of 0.7 kg/cm² after 3 days of aging. 100 kg of cement and 0.5 kg in solid basis of the mixing agent were added to 1 t of the dehydrated cake and mixed to obtain samples. The test results are shown in Table 5.

TABLE 5

| BLEND | AGING | SAMPLE NO. | UNIAXIAL COMPRESSIVE STRENGTH (kg/cm²) |
|---|---|---|---|
| Cement: | 1 day | No. 1 | 0.29 |
| 100 kg/t | | No. 2 | 0.31 |
| Soil Improving | | No. 3 | 0.27 |
| Mixing Agent: | | Average | 0.29 |
| 0.5 kg/t | 3 days | No. 4 | 0.72 |
| (in solid basis) | | No. 5 | 0.71 |
| | | No. 6 | 0.75 |
| | | Average | 0.73 |
| | 7 days | No. 7 | 1.09 |
| | | No. 8 | 1.05 |
| | | No. 9 | 1.12 |
| | | Average | 1.09 |

As can be understood from the test results, the uniaxial compressive strength after 3 days of aging exceeded the desired value of 0.7 kg/cm³. The strength of the original cake without the cement or the soil hardening mixing agent was immeasurable. The results showed that by employing the soil hardening mixing agent of the present invention, the inhibition of bond between cement and soil caused by an organic substance such as humic acid was restrained.

EXAMPLE 6

The soil hardening mixing agent having the same blending proportions as in the Example 1 was used to improve dredge soil of a river. The cement and the soil hardening mixing agent were blended as shown in Table 6 per 1 m³ of the collected dredge soil. The uniaxial compressive strength (qu: kg/cm²), moisture content ($\omega$: %), wetting density (p: t/m3) and pH were measured.

TABLE 6

| | | | | | | | |
|---|---|---|---|---|---|---|---|
| QUANTITY OF CEMENT kg/m³ | | | 30 | 40 | 40 | 40 | 40 |
| QUANTITY OF SOIL IMPROVING MIXING AGENT kg/m³ | | | 0.5 | 0 | 0.3 | 0.5 | 0.8 |
| AGING (DAYS) | 1 | qu (kg/cm²) | 0.13 | 0.25 | 0.31 | 0.34 | 0.33 |
| | | $\omega$ (%) | 53.82 | 55.05 | 53.12 | 51.45 | 51.62 |
| | | pt (t/m³) | 1.622 | 1.598 | 1.611 | 1.589 | 1.579 |
| | | pH | 12.6 | 12.8 | 12.9 | 12.9 | 12.8 |
| | 3 | qu (kg/cm²) | 0.15 | 0.27 | 0.34 | 0.41 | 0.42 |
| | | $\omega$ (%) | 49.69 | 53.90 | 51.49 | 50.89 | 49.16 |
| | | pt (t/m³) | 1.682 | 1.658 | 1.663 | 1.642 | 1.666 |
| | | pH | 12.4 | 12.8 | 12.9 | 12.9 | 12.8 |
| | 5 | qu (kg/cm²) | 0.30 | 0.39 | 0.43 | 0.52 | 0.54 |
| | | $\omega$ (%) | 48.07 | 49.46 | 48.26 | 50.80 | 48.61 |
| | | pt (t/m³) | 1.655 | 1.660 | 1.694 | 1.680 | 1.691 |
| | | pH | 12.4 | 12.8 | 12.8 | 12.8 | 12.7 |
| | 7 | qu (kg/cm²) | 0.43 | 0.46 | 0.51 | 0.62 | 0.64 |
| | | $\omega$ (%) | 46.65 | 47.51 | 47.28 | 48.64 | 47.49 |
| | | pt (t/m³) | 1.662 | 1.673 | 1.704 | 1.697 | 1.702 |
| | | pH | 12.0 | 12.2 | 12.3 | 12.3 | 12.2 |

FIELD SOIL $\omega$ = 80.12% pt = 1.506 t/m³ pH = 8.6

As can be understood from the test results, in accordance with the present example, moisture content and wetting density were increased than in the field soil in each of the samples, thereby showing improvement. From the point of view of the uniaxial compressive strength, although the adding quantity of cement necessary for increasing the strength can be said as 40 kg/m³, the strength is increased in proportion to the quantity of the soil hardening mixing agent so that a substantial adding effect was noted. The result showed that by employing the soil hardening mixing agent of the present invention, the inhibition of bond between cement and soil caused by an organic substance such as humic acid was restrained, thereby increasing the hardness of the soil.

From the foregoing it will be understood that the present invention restrains the inhibition of bond between cement and soil caused by an inhibiting organic substance such as humic acid including mainly corrosive acid so that the hardness of the soil is increased.

While the invention has been described in conjunction with preferred specific embodiment thereof, it will be understood that this description is intended to illustrate and not limit the scope of the invention, which is defined by the following claims.

What is claimed is:

1. A method for hardening soil, comprising the steps of:

mixing cement with soil; and mixing with the soil and cement, a soil hardening agent including at least eight cations selected from the group consisting of $Ca^{++}$, $Na^+$, $Mg^{++}$, $K^+$, $NH_4^+$, $Ba^{++}$, $Fe^{3+}$, $Al^{3+}$, $Mn^{4+}$, $Co^{++}$ and $Ti^{4+}$, at least two anions selected from the group consisting of $Cl^-$, $SO_4^{--}$ and $PO_4^{3-}$ and at least one organic acid.

2. The method according to claim 1 wherein the at least one organic acid is selected from the group consisting of citric acid, tartaric acid and maleic acid.

3. The method according to claim 1 wherein 0.3 to 2 kg of hardening agent is mixed with a soil mixture including 20 to 600 kg of cement per 1 m³ of soil.

4. A method for hardening soil comprising the steps of:

mixing at least $Ca^{++}$ and at least one chelating substance with a soil so as to neutralize inhibiting organic acids included in the soil;

mixing cement with the mixture of $Ca^{++}$ and the chelating substance and the soil; and mixing with the $Ca^{++}$, the organic acid and the soil, a soil hardening agent including at least eight cations selected from the group consisting of $Ca^{++}$, $Na^+$, $Mg^{++}$, $K^+$, $NH_4^+$, $Ba^{++}$, $Fe^{3+}$, $Al^{3+}$, $Mn^{4+}$, $Co^{++}$ and $Ti^{4+}$, and at least two anions selected from the group consisting of $Cl^-$, $SO_4^{--}$ and $PO_4^{3-}$.

5. The method according to claim 4 wherein the chelating substance comprises at least one of the sodium salts of citric acid, tartaric acid, maleic acid, ethylenediaminetetraacetic acid, and of nitrohumic acid.

6. A hardened soil comprising a soil mixed with cement, and further mixed with a mixing agent for hardening the soil including at least eight cations selected from the group consisting of $Ca^{++}$, $Na^+$, $Mg^{++}$, $K^+$, $NH_4^+$, $Ba^{++}$, $Fe^{3+}$, $Al^{3+}$, $Mn^{4+}$, $Co^{++}$ and $Ti^{4+}$, at least two anions selected from the group consisting of $Cl^-$, $SO_4^{--}$ and $PO_4^{3-}$, and at least one organic acid.

7. The improved soil according to claim 6 wherein the at least one organic acid is selected from the group consisting of citric acid, tartaric acid and maleic acid.

8. The improved soil according to claim 7 wherein 0.3 to 2 kg of mixing agent is mixed with a soil mixture including 20 to 600 kg of cement per 1 m³ of soil.

9. The improved soil according to claim 6 wherein 0.3 to 2 kg of mixing agent is mixed with a soil mixture including 20 to 600 kg of cement per 1 m³ of soil.

* * * * *